United States Patent
Lam et al.

(10) Patent No.: US 11,369,250 B2
(45) Date of Patent: Jun. 28, 2022

(54) DISHWASHER RACK HEIGHT ADJUSTMENT DEVICE

(71) Applicant: ELECTROLUX APPLIANCES AKTIEBOLAG, Stockholm (SE)

(72) Inventors: Cyndia Lam, Stockholm (SE); Henrik Wentzel, Bromma (SE)

(73) Assignee: Electrolux Appliances Aktiebolag

( * ) Notice: Subject to any disclaimer, the term of this patent is extended or adjusted under 35 U.S.C. 154(b) by 225 days.

(21) Appl. No.: 16/497,966

(22) PCT Filed: Mar. 31, 2017

(86) PCT No.: PCT/EP2017/057759
§ 371 (c)(1),
(2) Date: Sep. 26, 2019

(87) PCT Pub. No.: WO2018/177550
PCT Pub. Date: Oct. 4, 2018

(65) Prior Publication Data
US 2020/0022559 A1 Jan. 23, 2020

(51) Int. Cl.
*A47L 15/50* (2006.01)
*F16B 2/14* (2006.01)

(52) U.S. Cl.
CPC .............. *A47L 15/504* (2013.01); *F16B 2/14* (2013.01)

(58) Field of Classification Search
CPC .................................. A47L 15/504; F16B 2/14
See application file for complete search history.

(56) References Cited

U.S. PATENT DOCUMENTS

| 8,567,882 B1 * | 10/2013 | Garnett | A47L 15/504 |
| | | | 312/228.1 |
| 2004/0103932 A1 | 6/2004 | Kim | |
| 2005/0133469 A1 * | 6/2005 | Mersch | A47L 15/504 |
| | | | 211/41.8 |

(Continued)

FOREIGN PATENT DOCUMENTS

| DE | 3103059 A1 * | 8/1982 | ........... A47L 15/504 |
| DE | 4228954 A1 * | 3/1994 | ........... A47L 15/504 |

(Continued)

OTHER PUBLICATIONS

International Search Report and Written Opinion for Application No. PCT/EP2017/057759 dated Dec. 8, 2017, 10 pages.

*Primary Examiner* — Joseph L. Perrin
*Assistant Examiner* — Irina Graf
(74) *Attorney, Agent, or Firm* — RatnerPrestia (57) ABSTRACT

A dishwasher is disclosed that may include a washing chamber, a rack, and a bracket. The rack may be slidably arranged in relation to the bracket to provide different vertical positions of the rack in relation to the washing chamber. The dishwasher may include a securing mechanism configured to secure the rack in relation to the bracket, in at least a first vertical position of the rack in relation to the washing chamber. The securing mechanism may include a protruding element and a tapered portion. The protruding element may be arranged to extend into the tapered portion when the rack is in the first vertical position. The tapered portion may be arranged to prevent movement of the protruding element through the tapered portion to secure the rack in relation to the bracket.

15 Claims, 5 Drawing Sheets

(56) References Cited

U.S. PATENT DOCUMENTS

| | | | |
|---|---|---|---|
| 2011/0018410 A1* | 1/2011 | Bastuji | A47L 15/504 |
| | | | 312/228.1 |
| 2013/0300269 A1* | 11/2013 | Garnett | A47L 15/504 |
| | | | 312/228.1 |

FOREIGN PATENT DOCUMENTS

| | | | | |
|---|---|---|---|---|
| DE | 44 01 259 A1 | 7/1995 | | |
| DE | 102010031165 A1 * | 1/2012 | ........... | A47L 15/504 |
| EP | 0033483 A2 * | 8/1981 | ........... | A47L 15/504 |
| EP | 0848930 A2 * | 6/1998 | ........... | A47L 15/504 |
| EP | 2 074 925 A1 | 7/2009 | | |
| WO | WO 02/49495 A1 | 6/2002 | | |
| WO | WO-2017114630 A1 * | 7/2017 | ........... | A47L 15/504 |

\* cited by examiner

DISHWASHER RACK HEIGHT ADJUSTMENT DEVICE

CROSS-REFERENCE TO RELATED APPLICATIONS

This application is a national stage application filed under 35 U.S.C. § 371 of International Application No. PCT/EP2017/057759 filed Mar. 31, 2017 and published as WO2018177550, which application is hereby incorporated by reference herein in its entirety.

TECHNICAL FIELD

The present disclosure relates to a dishwasher comprising a washing chamber, a rack, and a bracket, wherein the bracket is arranged to hold the rack against a wall of the washing chamber.

BACKGROUND

A dishwasher is an apparatus for washing items using a force of washing liquid sprayed onto the items within a washing chamber of the dishwasher. The dishwasher usually comprises one or more racks positioned within the washing chamber, wherein the one or more racks is arranged to accommodate the items to be washed within the washing chamber.

Usually, such racks are mounted onto side walls of the washing chamber, using components such as rails and brackets, which are fastened to an inner wall of the washing chamber and to the rack using fastening elements. Also, most dishwashers comprise mounting arrangements which allows the rack to be extracted out of the washing chamber to facilitate access to the rack, for example by using components comprising rails and wheels.

Some dishwashers comprise height adjustment arrangements which allow a rack to be positioned at different vertical positions within the washing chamber. Thereby, a user can select heights suitable for different items, using the height adjustment arrangement. For example, if the rack is an upper rack, the user can select a lower vertical position of the rack to accommodate a bulky item in the rack, or can select an upper vertical position of the rack to accommodate a bulky item in a second rack positioned below the upper rack. Thus, a height adjustment arrangement can provide a more versatile interior of a dishwasher, where a user may select different vertical heights of a rack to wash bulkier objects, as well as to use of a total volume of the washing chamber more efficiently.

Some height adjustment arrangements comprise a bracket, wherein the rack is slidably arranged in relation to the bracket to provide different vertical positions of the rack in relation to the washing chamber. Such height adjustment arrangements may comprise a securing mechanism arranged to secure the rack in relation to the bracket, in some vertical position of the rack in relation to the washing chamber.

The items to be washed in a dishwasher may comprise items of different size, weight and shape such as delicate items, such as wine glasses, champagne flutes, etc., as well as heavier and bulkier items, such as pots and pans, etc. The loading of such items into the rack of the dishwasher puts requirements on mounting details of the rack. That is, in case a user puts a heavy pot in one corner of the rack, and the rest of the rack is empty, the mounting details of the rack will be subjected to an uneven load distribution which may cause the rack to tilt or wobble. In addition, also when loading lighter items into the rack, and when loading items into the rack in a manner providing a more even load distribution, it is a disadvantage if a rack is wobbly and unstable, regarding the users point of view, regarding the function of the dishwasher, as well as regarding the durability of the components of the dishwasher.

In addition, generally, today's consumer market requires high quality products which can be manufactured in a cost-efficient manner. Also, it is an advantage if the products are simple to use.

In view of the above, there is a need for dishwasher overcoming or at least alleviating, at least some of the above-mentioned problems.

SUMMARY

It is an object of the present invention to provide a dishwasher overcoming or at least alleviating, at least some of the above-mentioned problems.

According to a first aspect of the invention, the object is achieved by a dishwasher comprising a washing chamber, a rack, and a bracket, wherein the bracket is arranged to hold the rack against a wall of the washing chamber. The rack is configured to accommodate items to be washed within the washing chamber. The rack is slidably arranged in relation to the bracket to provide different vertical positions of the rack in relation to the washing chamber. The dishwasher comprises a securing mechanism configured to secure the rack in relation to the bracket, in at least a first vertical position of the rack in relation to the washing chamber. The securing mechanism comprises a protruding element and a tapered portion. One of the protruding element and the tapered portion is arranged at the rack, and the other of the protruding element and the tapered portion is arranged at the bracket. The protruding element is arranged to extend into the tapered portion when the rack is in the first vertical position, and wherein the tapered portion is arranged to prevent movement of the protruding element through the tapered portion to secure the rack in relation to the bracket.

Since the securing mechanism comprises a tapered portion, and since the tapered portion is arranged to prevent movement of the protruding element through the tapered portion to secure the rack in relation to the bracket, the rack is secured in the first vertical position in an efficient manner. In addition, due to the tapered portion, the rack is secured in the first vertical position using the wedge effect, meaning that the securing force of the rack will be greater the more weight the rack is subjected to. Thereby, a stable securing of the rack is provided in a simple and cost-effective manner.

In addition, due to the tapered portion, the stable securing of the rack is also obtained due to the fact that tapered portion will hinder movement of the protruding elements in directions being angled towards a direction in which the tapered portion is tapered.

As a result, a dishwasher is provided overcoming or at least alleviating, at least some of the above-mentioned problems. Accordingly, the above-mentioned object is achieved.

Optionally, the tapered portion is tapered in a first direction, wherein the first direction coincides with a vertical direction of the washing chamber. Thereby, an even more stable and efficient securing of the rack is provided since the first direction in which the tapered portion is tapered, coincides with a vertical direction of the washing chamber, which, when the dishwasher is positioned in an upright use-position, will coincide with a direction of the gravitational field.

Optionally, the tapered portion of the securing mechanism comprises a first securing member and a second securing member, wherein the first and the second securing members are arranged at a distance from each other forming an aperture at an end portion of the tapered portion. The aperture comprises an aperture width between the first and the second securing members. At least one of the first and the second securing members is displaceable relative the other securing member between a locking position, in which the aperture width is smaller than the extension of the protruding element to prevent movement of the protruding element through the tapered portion, and an unlocking position, in which the aperture width is larger than the extension of the protruding element to allow movement of the protruding element through the tapered portion. Thereby, a stable and efficient securing mechanism is provided capable securing the rack in the first vertical position, and capable of allowing displacement of the rack towards a second vertical position by allowing movement of the protruding element through the tapered portion.

Optionally, the securing mechanism comprises a support structure provided with a second tapered portion, wherein the tapered portion of the securing mechanism is arranged in the second tapered portion of the support structure. Thereby, the tapered portion of the securing mechanism is secured by the wedge effect of the second tapered portion of the support structure. As a result, an even more stable and efficient securing of the rack is provided.

Optionally, the second tapered portion of the support structure comprises a first and a second support structure member arranged at a distance from each other forming a support structure aperture at an end portion of the second tapered portion, wherein the support structure aperture a comprises a support structure aperture width between the first and second support structure members, wherein the support structure aperture width is larger than the extension of the protruding element to allow movement of the protruding element, through the second tapered portion, when the at least one securing member is in the unlocking position. Thereby, an even more stable and efficient securing mechanism is provided being capable of securing the rack in the first vertical position, and capable of allowing displacement of the rack towards a second vertical position by allowing movement of the protruding element through the second tapered portion.

Optionally, the tapered portion is tapered in a first direction, wherein the at least one securing member is arranged to be displaced to the unlocking position upon displacement of the protruding element in a second direction through the aperture of the tapered portion of the securing mechanism, wherein the second direction is opposite to the first direction. Thereby, a user-friendly securing mechanism is provided in which a user may displace the at least one securing member to the unlocking position, by displacing the rack from a second vertical position to the first vertical position.

Optionally, the at least one securing member is biased towards the locking position. Thereby, an even more user-friendly securing mechanism is provided in which a user may first displace the at least one securing member to the unlocking position, by displacing the rack from a second vertical position towards the first vertical position, and in which the least one securing member will be moved to the locking position, by the biasing force, when the rack reaches the first vertical position. Thus, a securing mechanism is provided circumventing the need for a user to perform any additional manoeuvres in order to secure the rack in the first vertical position, upon the displacement of the rack to the first vertical position.

Optionally, the securing mechanism comprises a grip connected to the at least one securing member to allow displacement of the at least one securing member from the locking position to the unlocking position by displacement of the grip. Thereby, a user-friendly securing mechanism is provided allowing a user to displace the least one securing member from the locking position to the unlocking position in a simple manner.

Optionally, the securing mechanism comprises a first arm and a second arm each comprising a first end, wherein the first and second arms are connected to each other in a connection at the respective first end, wherein the first securing member is arranged at a second end of the first arm and the second securing member is arranged at a second end of the second arm. Thereby, an efficient securing mechanism is provided, which can be provided in a cost-efficient manner.

Optionally, at least one of the first and the second securing members is displaceable relative the other securing member by bending of at least one of the first and second arms. Thereby, an efficient securing mechanism is provided wherein at least one of the first and the second securing members may assume a locking position or an unlocking position. In addition, the at least one securing member can be made biased towards the locking position, in a simple and efficient manner. Still further, due to these features, the securing mechanism can be provided in a cost-efficient manner Optionally, the grip is connected to the connection. Thereby, a user-friendly securing mechanism is provided, which can be provided in a cost-efficient manner while allowing a user to displace the least one securing member from the locking position to the unlocking position in a simple manner.

Optionally, the tapered portion comprises an aperture at an end portion thereof, wherein the rack comprises an elongated body comprising the protruding element, wherein the elongated body extends through the aperture of the tapered portion. Thereby, a simple, effective and stable securing mechanism is provided in which the elongated body that comprises the protruding element may move through the aperture of the tapered portion upon vertical displacement of the rack.

Optionally, the elongated body comprises an essentially vertically oriented wire of the rack. Thereby, a simple, effective and stable securing mechanism is provided which may utilize already existing components of the rack of the dishwasher.

Optionally, the essentially vertically oriented wire of the rack comprises at least one bended portion forming the protruding element. Thereby, a simple, effective and stable securing mechanism is provided which may utilize an already existing component of the rack of the dishwasher. Thus, according to these embodiments, the protruding element can be provided in a simple manner by bending one or more portions of an essentially vertically oriented wire of the rack. As a result, the protruding element can be provided in a cost-efficient manner.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
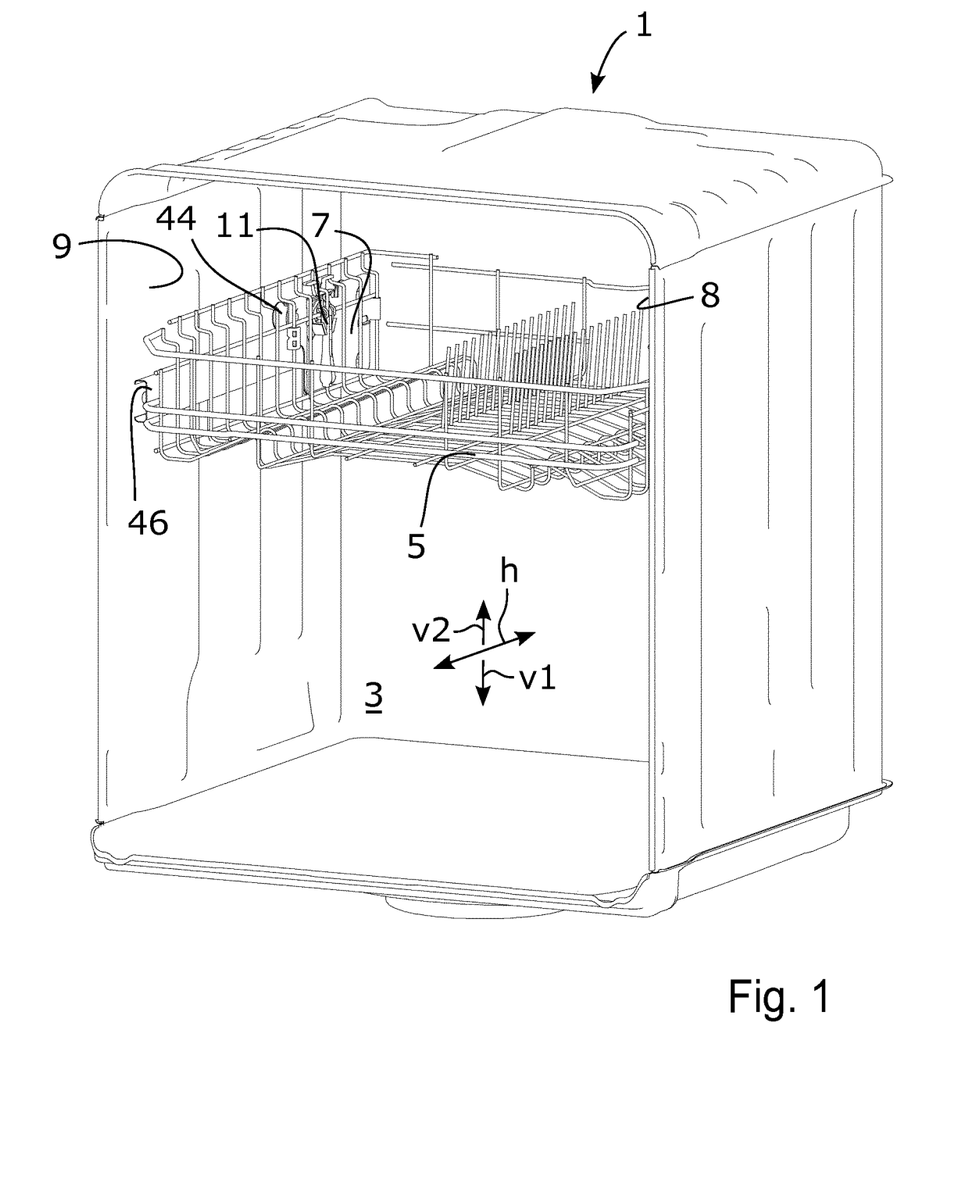
FIG. 1 illustrates a dishwasher comprising a washing chamber, a rack, a bracket, and a securing mechanism configured to secure the rack in relation to the bracket.

FIG. 1 illustrates a dishwasher 1 comprising a washing chamber 3, a rack 5, and a bracket 7. The bracket 7 is arranged to hold the rack 5 against a wall 9 of the washing chamber 3. The rack 5 is configured to accommodate items to be washed within the washing chamber 3. The dishwasher 5 further comprises a casing, one or more spray arrangements configured to spray washing liquid onto the items within the washing chamber 9, and a dishwasher door, wherein the dishwasher door is arranged to provide a closure of the washing chamber 9. These components are not illustrated for the reason of brevity and/or clarity. The rack 5 is slidably arranged in relation to the bracket 7 to provide different vertical positions of the rack 5 in relation to the washing chamber 3. The dishwasher 1 further comprises a securing mechanism 11 configured to secure the rack 5 in relation to the bracket 7, in at least a first vertical position of the rack 5 in relation to the washing chamber 3.

Figure 2:
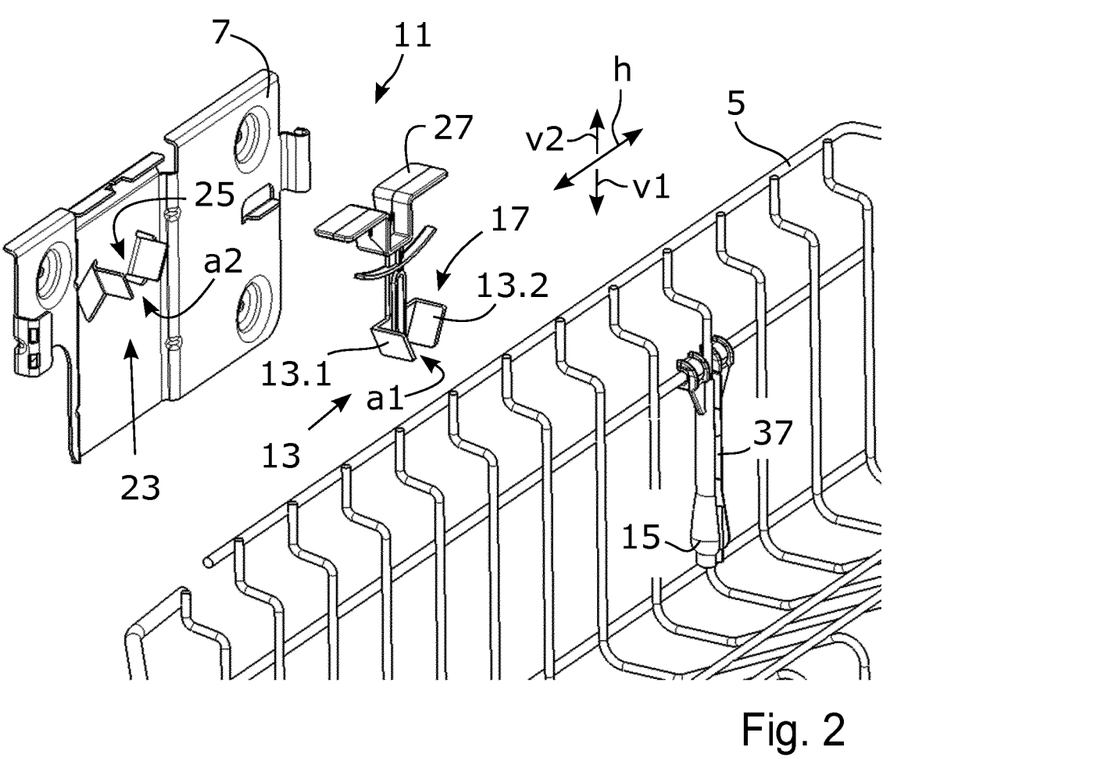
FIG. 2 illustrates an exploded view of the rack, the bracket and the securing mechanism of the dishwasher, illustrated in FIG. 1.

FIG. 2 illustrates an exploded view of the rack 5, the bracket 7 and the securing mechanism 11 of the dishwasher 1, illustrated in FIG. 1. As illustrated, the securing mechanism 11 comprises a protruding element 15 and a tapered portion 17. According to the illustrated embodiments, the protruding element 15 is arranged at the rack 5, and the tapered portion 17 is arranged at the bracket 7. However, as will be further explained below, the protruding element 15 may be arranged at the bracket 7, and the tapered portion 17 may be arranged at the rack 5. The protruding element 15 is arranged to extend into the tapered portion 17 when the rack 5 is in the first vertical position. The tapered portion 17 is arranged to prevent movement of the protruding element 15 through the tapered portion 17 to secure the rack 5 in relation to the bracket 7 in the first vertical position.

Figure 3:
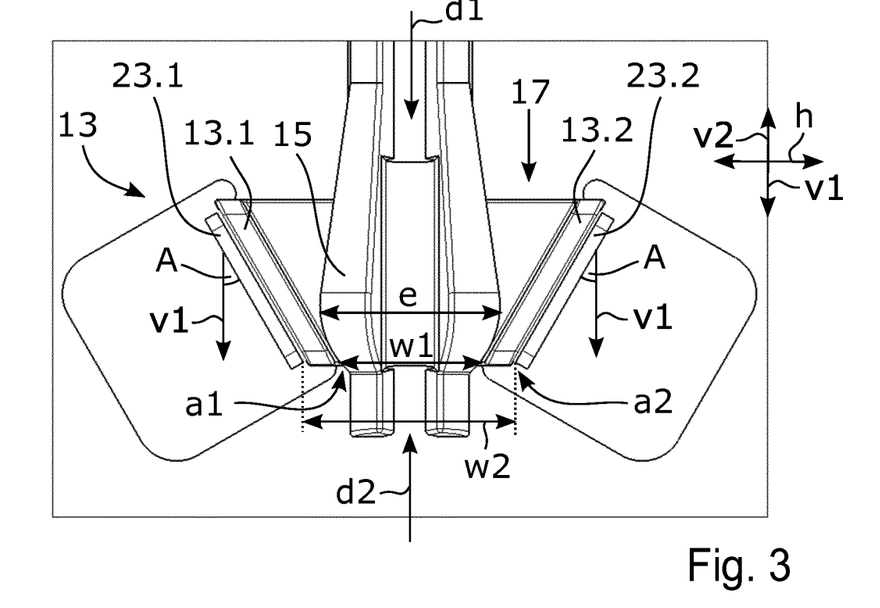
FIG. 3 illustrates a protruding element and a tapered portion of the securing mechanism illustrated in FIG. 2, wherein a first and a second securing member of the tapered portion are illustrated in a locking position.

FIG. 3 illustrates the protruding element 15 and the tapered portion 17 of the securing mechanism 11 illustrated in FIG. 2. In FIG. 3, the protruding element 15 extends into the tapered portion 17, and the position of the protruding element 15 in FIG. 3 corresponds to a position obtained when the rack 5 is in the first vertical position. The tapered portion 17 is an inwardly tapered portion.

Figure 4:
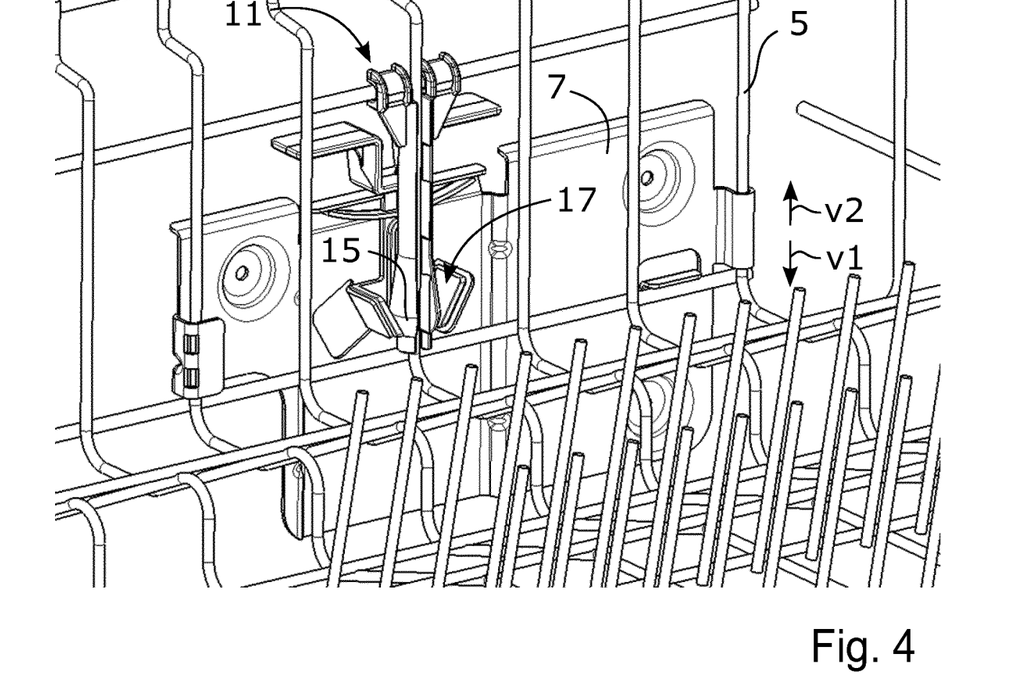
FIG. 4 illustrates the rack, the bracket and the securing mechanism of FIG. 2, in an assembled state, wherein the rack is in a first vertical position.

FIG. 4 illustrates the rack 5, the bracket 7 and the securing mechanism 11 of FIG. 2 in an assembled state, wherein the rack 5 is in the first vertical position. As illustrated, the protruding element 15 extends into the tapered portion 17. The tapered portion 17 prevents movement of the protruding element 15 through the tapered portion 17 to secure the rack 5 in relation to the bracket 7. Thereby, a stable securing mechanism 11 is provided utilizing the so-called wedge effect. As a result of the wedge effect, the securing force of the securing mechanism 11 will be greater the more weight the rack 5 is subjected to. As indicated in FIG. 3, the tapered portion 17 is tapered in a first direction d1. According to the illustrated embodiments, the first direction d1 coincides with a first vertical direction v1 of the washing chamber 3. The first vertical direction v1 of the washing chamber 3 is a direction coinciding with a direction of the gravitational field of the earth when the dishwasher 1 is positioned in an upright use-position. As a result of the wedge effect of the tapered portion 17, the tapered portion 17 provides stability for the rack 5 relative the bracket 7 also in directions differing from the first vertical direction v1, such as horizontal directions h of the washing chamber. Horizontal directions h of the washing chamber are essentially perpendicular to the direction of the gravitational field when the dishwasher 1 is positioned in the upright use-position.

According to the illustrated embodiments, and as indicated in FIG. 3, the tapered portion 17 of the securing mechanism 11 comprises a first securing member 13.1 and a second securing member 13.2. According to the illustrated embodiments, the first securing member 13.1, as well as the second securing member 13.2, is provided with an angle A relative the first vertical direction v1 to form the tapered portion 17. According to the illustrated embodiments, the angle A is approximately 31°. The angle A may, according to further embodiments, be within the range of 15°-45°, or 20°-40°, or 25°-37°, or 27°-34°. The wedge effect is greater for a smaller angle A than for a greater angle A. However, a too small angle A may have a negative impact on the precision of the vertical positioning of the rack 5 and may lead to difficulties in displacing the protruding element out of the tapered portion 17. Therefore, the above given ranges for the angle A has proven to provide the best compromise for achieving a proper wedge effect, while avoiding the above-mentioned drawbacks of a too small angle A.

According to further embodiments, one of the first securing member 13.1 and the second securing member 13.2 is provided with an angle A relative the first vertical direction v1, for example an angle A within the above described ranges, and wherein the other of the first securing member 13.1 and the second securing member 13.2 is provided with essentially no angle towards the first vertical direction v1, i.e. having an extension essentially coinciding with the first vertical direction v1. Also in such embodiments, a tapered portion is formed between the first securing member 13.1 and the second securing member 13.2 capable of preventing movement of the protruding element 15 through the tapered portion 17 to secure the rack 5 in relation to the bracket 7.

According to the illustrated embodiments, the first and the second securing members 13.1, 13.2 are arranged at a distance from each other forming an aperture a1 at an end portion of the tapered portion 17. The aperture a1 comprises an aperture width w1 between the first and the second securing members 13.1, 13.2.

Further, according to the illustrated embodiments, and as indicated in FIG. 2, the securing mechanism 11 comprises a support structure 23 provided with a second tapered portion 25.

As indicated in FIG. 3, the tapered portion 17 of the securing mechanism 11 is arranged in the second tapered portion 25 of the support structure 23. The second tapered portion 25 is an inwardly tapered portion. The second tapered portion 25 of the support structure 23 comprises a first and a second support structure member 23.1, 23.2 arranged at a distance from each other forming a support structure aperture a2 at an end portion of the second tapered portion 25. According to the illustrated embodiments, the first and a second support structure members 23.1, 23.2 are provided with an angle A relative the first vertical direction v1, corresponding to the angles A of the first and second securing members 13.1, 13.2, to form the second tapered portion 25. The support structure aperture a2 comprises a support structure aperture width w2 between the first and second support structure members 23.1, 23.2. According to the illustrated embodiments, the support structure aperture width w2 is larger than the extension e of the protruding element 15.

According to the illustrated embodiments, the first and the second securing members 13.1, 13.2 are displaceable relative each other between a locking position and an unlocking position. In FIG. 3, the first and the second securing members 13.1, 13.2 are illustrated in the locking position. In the locking position, the aperture width w1 between the first and the second securing members 13.1, 13.2 is smaller than the extension e of the protruding element 15. Thereby, movement of the protruding element 15 through the tapered portion 17, in the first direction d1, is prevented.

In the unlocking position, the aperture width w1 between the first and the second securing members 13.1, 13.2 is larger than the extension e of the protruding element 15. Thereby, movement of the protruding element 15 through the tapered portion 17, in the first direction d1, is allowed.

Figure 5:
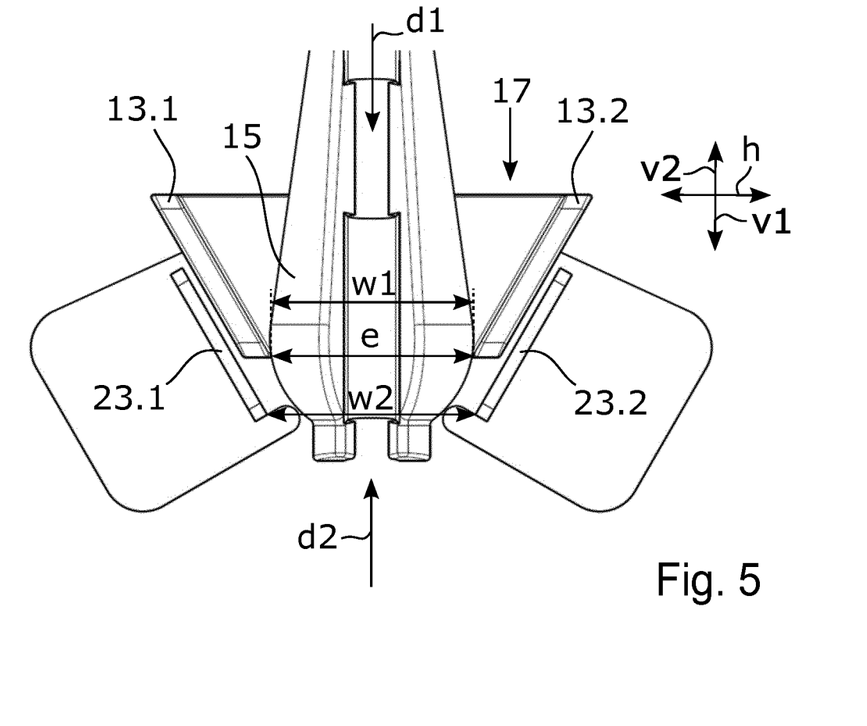
FIG. 5 illustrates the protruding element and the tapered portion of FIG. 3, wherein the first and the second securing members are illustrated in an unlocking position.

FIG. 5 illustrates the protruding element 15 and the tapered portion 17 of FIG. 3, wherein the first and the second securing members 13.1, 13.2 are illustrated in the unlocking position. As illustrated, in the unlocking position, the aperture width w1 between the first and the second securing members 13.1, 13.2 is larger than the extension e of the protruding element 15. As mentioned, due to these features, movement of the protruding element 15 through the tapered portion 17 is allowed in the first direction d1. Further, since the support structure aperture width w2 is larger than the extension e of the protruding element 15, movement of the protruding element 15 is also allowed through the second tapered portion 25 of the support structure, when the at least one securing member 13.1, 13.2 is in the unlocking position. As a result, the rack 5, which according to the illustrated embodiments is connected to the protruding element 15, is allowed to be displaced from the first vertical position of the rack 5 in relation to the washing chamber 3, as illustrated in FIG. 4, to a second vertical position of the rack 5 in relation to the washing chamber 3.

Figure 6:
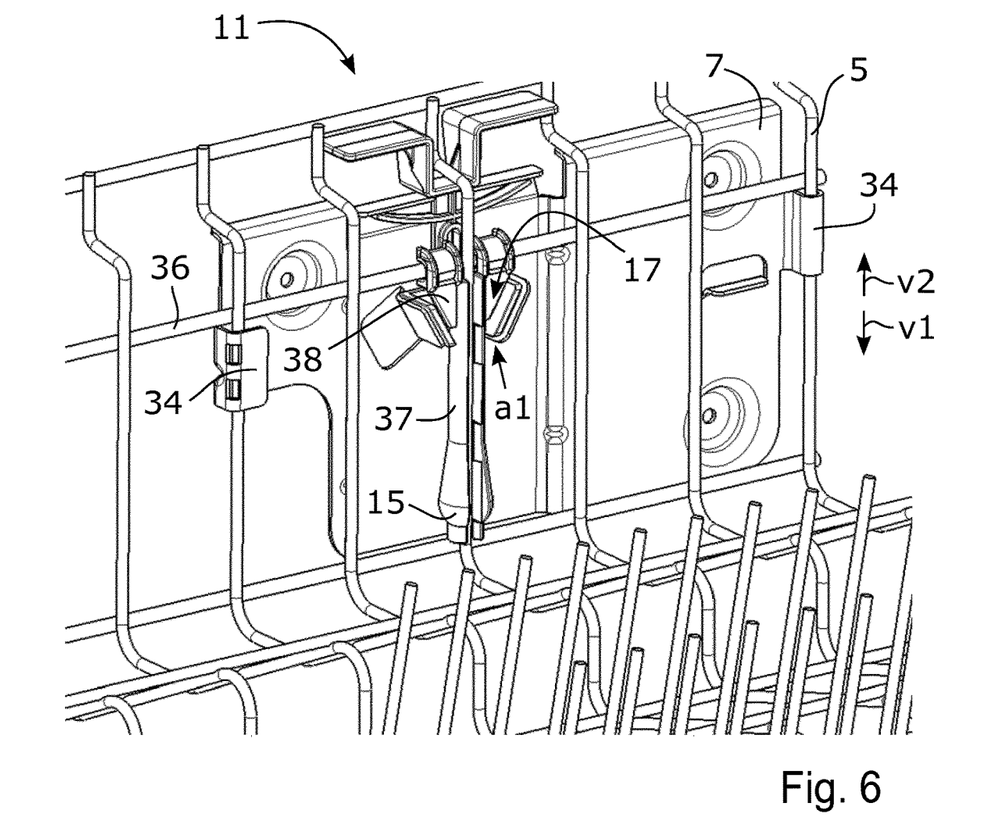
FIG. 6 illustrates the rack, the bracket and the securing mechanism of FIG. 4, wherein the rack is in a second vertical position.

FIG. 6 illustrates the rack 5, the bracket 7 and the securing mechanism 11 of FIG. 4, wherein the rack 5 is in the second vertical position. As illustrated, the protruding element 15 has been displaced through the tapered portion 17, and is, according to the illustrated embodiments, positioned below the tapered portion 17 when the rack 5 is in the second vertical position. Further, according to the illustrated embodiments, the rack 5 comprises an elongated body 37 comprising the protruding element 15, wherein the elongated body 37 extends through the aperture a1 of the tapered portion 17. According to the embodiments illustrated in FIG. 6, the elongated body 37 comprising the protruding element 15 is formed by one coherent piece of plastic material, which is snapped onto an essentially vertically oriented wire of the rack 5. However, the elongated body 37, as well as the protruding element 15, may comprise another shape and design than those illustrated in FIG. 6, as will be further explained below.

According to the illustrated embodiments, the rack 5 is slidably arranged in relation to the bracket 7 in a fastening elements 34 of the bracket 7. The fastening elements 34 of the illustrated embodiments comprise bended portions of the bracket 7. Each of the fastening elements 34 is arranged to enclose an essentially vertically oriented wire of the rack 5. According to the illustrated embodiments, when the rack 5 is in the second vertical position in relation to the washing chamber 3, the fastening elements 34 are arranged to abut against an essentially horizontally oriented wire 36 of the rack 5 to secure the rack 5 in relation to the bracket 7 in the second vertical position and to prevent movement of the rack 5 past the second vertical position.

Further, according to the illustrated embodiments, the elongated body 37 comprises a stabilizing element 38 arranged to extend into the tapered portion 17 when the rack 5 is in the second vertical position. The stabilizing element 38 is wedge-shaped and arranged to fit into the tapered portion 17 to provide a stabilizing effect on the rack 5. Thus, according to the illustrated embodiments, the main purpose of the stabilizing element 38 is not to prevent movement of the rack 5 past the second vertical position but to provide a stabilizing effect on the rack 5 when the rack 5 is in the second vertical position. According to further embodiments, the stabilizing element 38 may function as a protruding element preventing movement of the rack 5 past the second vertical position.

According to further embodiments, the elongated body 37 may comprise one or more further protruding elements arranged at different vertical positions at the elongated body 37 than the protruding element 15. Such one or more further protruding elements may be arranged at the elongated body 37 in positions between the protruding element 15 and the stabilizing element 38, to provide more vertical positions of the rack 5 in relation to the washing chamber 3, in which the securing mechanism secures the rack 5 in relation to the washing chamber 3.

According to the illustrated embodiments, a user may displace the rack 5, from the second vertical position, as illustrated in FIG. 6, to the first vertical position, as illustrated in FIG. 4, simply by displacing the rack 5 towards the first vertical position. In the illustrated embodiments, the direction of such displacement coincides with the second vertical direction v2 indicated in FIG. 4 and FIG. 6.

Upon such a displacement of the rack 5, the protruding element 15 will be displaced through the aperture a1 of the tapered portion 17 of the securing mechanism 11 in a second direction d2, indicated in FIG. 5. The second direction d2 is opposite to the first direction d1. As indicated in FIG. 5, the first and second securing members 13.1, 13.2 are arranged to be displaced to the unlocking position upon displacement of the protruding element 15 in the second direction d2 through the aperture a1 of the tapered portion 17 of the securing mechanism 11. Thereby, the user may, as described above, displace the rack 5, from the second vertical position, as illustrated in FIG. 6, to the first vertical position, as illustrated in FIG. 4, simply by displacing the rack 5 towards the first vertical position. The first and second securing members 13.1, 13.2 will be displaced to the unlocking position as a result thereof.

Further, according to the illustrated embodiments, the first and second securing members 13.1, 13.2 are biased towards the locking position. Thereby, the first and second securing members 13.1, 13.2 will assume the locking position when the rack reaches the first vertical position, and the protruding element 15 as a result thereof reaches a position as is illustrated in FIG. 3. Thus, a securing mechanism 11 is provided circumventing the need for a user to perform any additional manoeuvres in order to secure the rack 5 in the first vertical position upon displacement of the rack 5 to the first vertical position.

Figure 7:
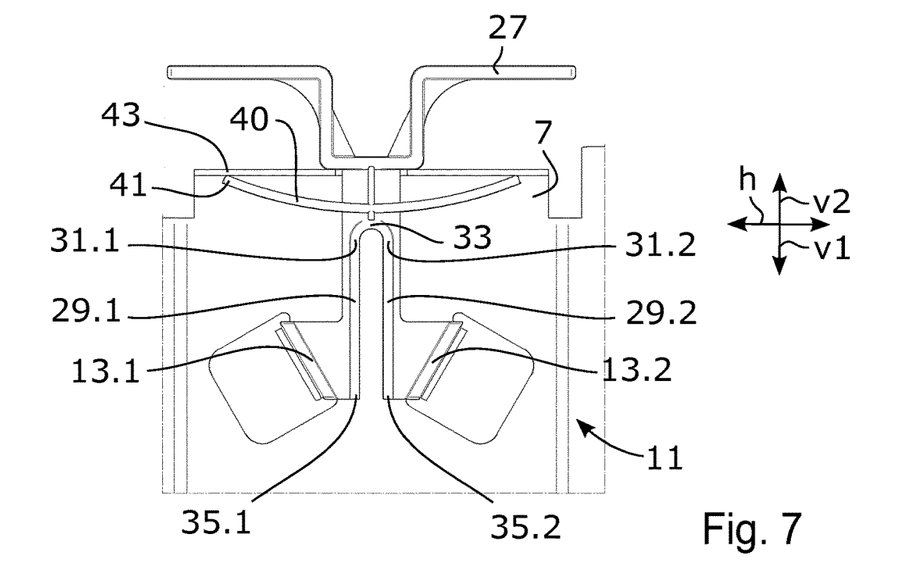
FIG. 7 illustrates a portion of the securing mechanism according to the embodiments illustrated in FIG. 1-FIG. 6.

FIG. 7 illustrates a portion of the securing mechanism 11 according to the embodiments illustrated in FIG. 1-FIG. 6. According to these embodiments, the securing mechanism 11 comprises a first arm 29.1 and a second arm 29.2 each comprising a first end 31.1, 31.2. The first and second arms 29.1, 29.2 are connected to each other in a connection 33 at the respective first end 31.1, 31.2. The first securing member 13.1 is arranged at a second end 35.1 of the first arm 29.1 and the second securing member 13.2 is arranged at a second end 35.2 of the second arm 29.2. According to the illustrated embodiments, the first and the second securing members 13.1, 13.2 are displaceable relative each other by bending of the first and second arms 29.1, 29.2. The first and second arms 29.1, 29.2 are adapted such that the first and the second securing members 13.1, 13.2 are in the locking position in an unbent state of the first and second arms 29.1, 29.2. According to the illustrated embodiments, the securing mechanism 11 comprises a grip 27 connected to the connection 33 and thus connected to the first and second securing members 13.1, 13.2, via the first and second arms 29.1, 29.2. The securing mechanism 11 further comprises a spring element 40 having portions 41 which, according to the illustrated embodiments, are connected to a flange 43 of the bracket 7.

When the rack 5 is in the first vertical position, as illustrated in FIG. 4, and the grip 27 is displaced in the second vertical direction v2 indicated in FIG. 7, the first and second securing members 13.1, 13.2 will be displaced from the locking position, as illustrated in FIG. 3 as well as in FIG. 7, to the unlocking position, illustrated in FIG. 5. As a result, the rack 5 can, in a simple manner, be displaced from the first vertical position, as illustrated in FIG. 4, to the second vertical position, illustrated in FIG. 6. Upon the displacement of the grip 27 in the second vertical direction v2, the spring element 40 will deform and the first and second arms 29.1, 29.2 will bend as the first and second securing members 13.1, 13.2 will follow the contours of the protruding element. The protruding element is not illustrated in FIG. 7 for the reason of brevity and clarity, but is for example visible in FIG. 3. When the grip 27 is released, and when the rack 5 reaches a position where the protruding element has been displaced out of the tapered portion 17, the first and second securing members 13.1, 13.2 will assume the locking position, as illustrated in FIG. 7, as a result of a biasing force of the spring element 40 in the first vertical direction v1, indicated in FIG. 7, and as a result of the biasing force of the first and second arms 29.1, 29.2, essentially in the horizontal directions h indicated in FIG. 7. The biasing force of the first and second arms 29.1, 29.2 in the horizontal directions h are obtained by the deformation of the first and second arms 29.1, 29.2. Thus, according to the illustrated embodiments, the first and second securing members 13.1, 13.2 are biased towards the locking position via the spring element 40, as well as via the first and second arms 29.1, 29.2.

Figure 8:
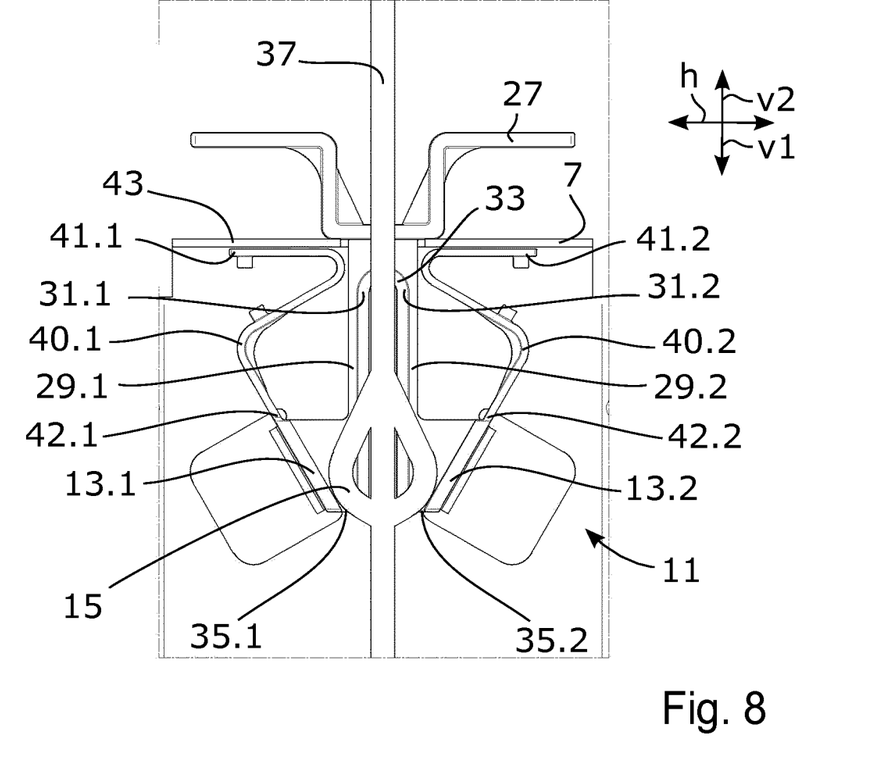
FIG. 8 illustrates a securing mechanism according to some further embodiments.

According to the illustrated embodiments, the first and second securing members 13.1, 13.2, the first arm 29.1, the second arm 29.2, the grip 27 and the spring element 40 are provided in one coherent piece of plastic material. Thereby, the securing member 11 can be provided in a cost-efficient manner while providing the advantages described herein. However, it is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims FIG. 8 illustrates a securing mechanism 11 according to some further embodiments. The securing mechanism 11 according to the embodiments illustrated in FIG. 8 comprises the corresponding components, features and functions as those described above, with some differences. A first difference is that the securing mechanism 11, according to the embodiments illustrated in FIG. 8, comprises a protruding element 15 of another design and shape than those described with reference to the FIG. 1-7. The elongated body 37 comprises an essentially vertically oriented wire of the rack, wherein the essentially vertically oriented wire comprises a number of wire sections being welded to the essentially vertically oriented wire to form the protruding element 15. Thereby, a simple and effective protruding element 15 is provided, which can be provided in a cost-efficient manner.

A second difference between the embodiments of the securing mechanism 11 illustrated in FIG. 8 and the embodiments of the securing mechanism 11 illustrated in FIG. 1-7 is that the securing mechanism 11, according to the embodiments illustrated in FIG. 8, comprises a first spring element 40.1 and a second spring element 40.2. The first spring element 40.1 comprises a first portion 41.1 connected to a flange 43 of the bracket 7 and a second portion 42.1 connected to the first securing member 13.1. Likewise, the second spring element 40.2 comprises a first portion 41.2 connected to the flange 43 of the bracket 7 and a second portion 42.2 connected to the second securing member 13.2. Upon displacement of the grip 27 in the second vertical direction v2, the first and second spring elements 40.1, 40.2 will deform, and the first and second arms 29.1, 29.2 will bend since the first and second securing members 13.1, 13.2 will follow the contours of the protruding element 15. When the grip 27 is released, and when the rack 5 reaches a position where the protruding element 15 has been displaced out of the tapered portion, the first and second securing members 13.1, 13.2 will assume the locking position, as a result of a biasing force of the first and second spring elements 40.1, 40.2, and as a result of the first and second arms 29.1, 29.2 assuming their original shape. Thus, according to the embodiments of FIG. 8, the first and second securing members 13.1, 13.2 are biased towards the locking position via the first and second spring elements 40.1, 40.2, as well as via the first and second arms 29.1, 29.2.

Figure 9:
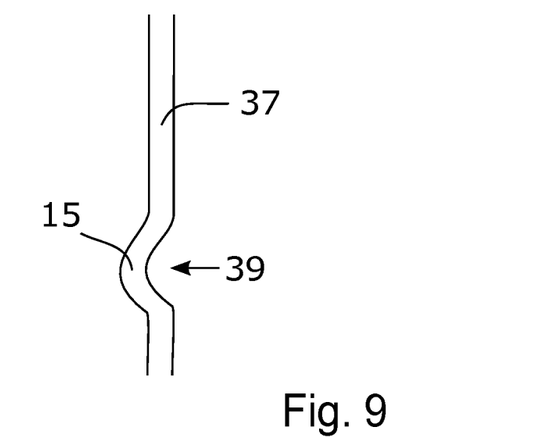
FIG. 9 illustrates a protruding element according to some further embodiments.

FIG. 9 illustrates a protruding element 15 according to some further embodiments. According to the embodiments illustrated in FIG. 9, the protruding element 15 is formed by a bended portion 39 of an essentially vertically oriented wire of the rack. Thus, according to these embodiments, the protruding element 15 can be provided simply by bending one or more portions 39 of an essentially vertically oriented wire of the rack. As a result, the protruding element 15 can be provided in a cost-efficient manner.

According to the embodiments of the securing mechanism 11 illustrated in the FIGS. 1-8, the protruding element 15 is arranged at the rack 5, and the tapered portion 17 is arranged at the bracket 7. However, according to further embodiments of the securing mechanism 11, the protruding element 15 is arranged at the bracket 7 and the tapered portion 17 is arranged at the rack 5. In such embodiments, the tapered portion 17 may be tapered in a first direction d1, wherein the first direction d1 coincides with a second vertical direction v2 of the washing chamber 3, wherein the second vertical direction v2 of the washing chamber 3 is a direction essentially opposite to the direction of the gravitational field of the earth when the dishwasher 1 is positioned in an upright use-position. Also in such embodiments, the tapered portion is an inwardly tapered portion. Further, according to such embodiments, an actuation direction of a grip may be opposite to the actuation direction of the grip 27 of illustrated embodiments. Aside from these differences, the securing mechanism according to such embodiments may function in the corresponding manner as the embodiments of the securing mechanism 11 described above.

According to the embodiments of the dishwasher 1 illustrated in FIG. 1, the dishwasher 1 comprises a rail 46 mounted onto a first inner side wall 9 of the washing chamber 3. The bracket 7 comprises wheels 44. Rolling surfaces of the wheels 44 are arranged to abut against the rail 46 to allow the horizontal displacement of the rack 5 in relation to the wall 9 of the washing chamber 3.

The dishwasher 1 of FIG. 1 further comprises a second rail mounted onto a second inner side wall 8 of the washing chamber 3, wherein the second inner side wall 8 is opposite to the first inner side wall 9. The dishwasher 1 further comprises a second bracket arranged to hold the rack 5 against the second inner side wall 8 of the washing chamber. Further, the dishwasher 1 comprises a second securing mechanism arranged between the rack 5 and the second bracket and which also is configured to secure the rack 5 in relation to the bracket 7. The second bracket, the second rail and the second securing mechanism are not visible in FIG. 1 but are of similar, but mirrored, design as the bracket 7, the rail 46 and the securing mechanism 11 illustrated in FIG. 1.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A dishwasher comprising:
   a washing chamber;
   a rack; and
   a bracket,
   wherein the bracket is arranged to hold the rack against a wall of the washing chamber,
   wherein the rack is configured to accommodate items to be washed within the washing chamber, wherein the rack is slidably arranged in relation to the bracket to provide different vertical positions of the rack in relation to the washing chamber,
   wherein the dishwasher comprises a securing mechanism configured to secure the rack in relation to the bracket, in at least a first vertical position of the rack in relation to the washing chamber,
   wherein the securing mechanism comprises a protruding element and a tapered portion,
   wherein one of the protruding element and the tapered portion is arranged at the rack, and the other of the protruding element and the tapered portion is arranged at the bracket, wherein the protruding element is arranged to extend into the tapered portion when the rack is in the first vertical position,
   wherein the tapered portion is arranged to prevent movement of the protruding element through the tapered portion to secure the rack in relation to the bracket,
   wherein the tapered portion comprises a first securing member and a second securing member, wherein the first and the second securing members are angled toward each other relative to a vertical direction that is in a direction of gravity and arranged at a distance from each other forming an aperture at an end portion of the tapered portion, wherein the aperture comprises an aperture width between the first and the second securing members in a locking position, in which the aperture width is smaller than an extension width (e), which is a maximum width of the protruding element, to prevent movement of the protruding element through the tapered portion, such that a securing force between the tapered portion and the protruding element increases with an increase in weight of the rack, and
   wherein at least one of the first and the second securing members is displaceable relative the other securing member between the locking position and an unlocking position, wherein, in the unlocking position, the aperture width is larger than the extension width (e) of the protruding element to allow movement of the protruding element through the tapered portion.

2. The dishwasher according to claim 1, wherein the tapered portion is tapered in a first direction (d1), wherein the first direction (d1) coincides with the vertical direction (v1, v2) of the washing chamber.

3. The dishwasher according to claim 1, wherein the securing mechanism comprises a support structure provided with a second tapered portion, wherein the tapered portion of the securing mechanism is arranged in the second tapered portion of the support structure.

4. The dishwasher according to claim 1, wherein the second tapered portion of the support structure comprises a first and a second support structure member arranged at a distance from each other forming a support structure aperture (a2) at an end portion of the second tapered portion, wherein the support structure aperture (a2) comprises a support structure aperture width (w2) between the first and second support structure members, wherein the support structure aperture width (w2) is larger than the extension width (e) of the protruding element to allow movement of the protruding element, through the second tapered portion, when the at least one securing member is in the unlocking position.

5. The dishwasher (1) according to claim 1, wherein the tapered portion is tapered in a first direction (d1), wherein the at least one securing member is arranged to be displaced to the unlocking position upon displacement of the protruding element in a second direction (d2) through the aperture (a1) of the tapered portion of the securing mechanism, wherein the second direction (d2) is opposite to the first direction (d1).

6. The dishwasher according to claim 1, wherein the at least one securing member is biased towards the locking position.

7. The dishwasher according to claim 1, wherein the securing mechanism comprises a grip connected to the at least one securing member to allow displacement of the at least one securing member from the locking position to the unlocking position by displacement of the grip.

8. The dishwasher according to claim 7, wherein the securing mechanism comprises a first arm and a second arm each comprising a first end, wherein the first and second arms are connected to each other in a connection at the respective first end, wherein the first securing member is arranged at a second end of the first arm and the second securing member is arranged at a second end of the second arm.

9. The dishwasher according to claim 8, wherein at least one of the first and the second securing members is displaceable relative the other securing member by bending of at least one of the first and second arms.

10. The dishwasher according to claim 8, wherein the grip is connected to the connection.

11. The dishwasher according to claim 1, wherein the tapered portion is arranged at the bracket and the protruding element is arranged at the rack.

12. The dishwasher according to claim 11, wherein the rack comprises an elongated body comprising the protruding element, wherein the elongated body extends through the aperture (a1) of the tapered portion.

13. The dishwasher according to claim 12, wherein the elongated body comprises an essentially vertically oriented wire of the rack.

14. The dishwasher according to claim 13, wherein the essentially vertically oriented wire of the rack comprises at least one bended portion forming the protruding element.

15. The dishwasher according to claim 1, wherein the protruding element includes a stabilizing element a predetermined distance from the extension width (e), wherein the stabilizing element is arranged to extend into the tapered portion when the rack is in a second vertical position, and wherein the tapered portion is arranged to prevent movement of the stabilizing element through the tapered portion to secure the rack in relation to the bracket.

* * * * *